United States Patent
Seo et al.

(10) Patent No.: US 9,554,393 B2
(45) Date of Patent: Jan. 24, 2017

(54) METHOD FOR TRANSMITTING CONTROL INFORMATION FOR DIRECT D2D COMMUNICATION IN WIRELESS COMMUNICATION SYSTEMS, AND APPARATUS FOR SAME

(71) Applicant: LG ELECTRONICS INC., Seoul (KR)

(72) Inventors: Hanbyul Seo, Anyang-si (KR); Hakseong Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/390,321

(22) PCT Filed: Apr. 18, 2013

(86) PCT No.: PCT/KR2013/003299
§ 371 (c)(1),
(2) Date: Oct. 2, 2014

(87) PCT Pub. No.: WO2013/157870
PCT Pub. Date: Oct. 24, 2013

(65) Prior Publication Data
US 2015/0071207 A1    Mar. 12, 2015

Related U.S. Application Data

(60) Provisional application No. 61/635,845, filed on Apr. 19, 2012, provisional application No. 61/751,268, (Continued)

(51) Int. Cl.
*H04W 72/12* (2009.01)
*H04W 76/02* (2009.01)
*H04L 5/00* (2006.01)

(52) U.S. Cl.
CPC ......... *H04W 72/12* (2013.01); *H04W 72/1289* (2013.01); *H04W 76/023* (2013.01);
(Continued)

(58) Field of Classification Search
None
See application file for complete search history.

(56) References Cited

U.S. PATENT DOCUMENTS

2009/0325625 A1* 12/2009 Hugl .................... H04W 52/16
455/522
2012/0163252 A1* 6/2012 Ahn ..................... H04L 1/0003
370/280
(Continued)

FOREIGN PATENT DOCUMENTS

CN    102395160    3/2012
CN    102577523    7/2012
(Continued)

OTHER PUBLICATIONS

PCT International Application No. PCT/KR2013/003299, Written Opinion of the International Searching Authority dated Jul. 24, 2013, 12 pages.
(Continued)

*Primary Examiner* — Diane Lo
(74) *Attorney, Agent, or Firm* — Lee Hong Degerman Kang & Waimey

(57) ABSTRACT

The present invention relates to a method for performing direct D2D communication by means of a first device in a wireless communication system. In particular, the method includes the steps of: detecting a scheduling message from a plurality of first subframes in which the search region of the scheduling message for D2D direct communication is activated; and performing direct D2D communication with a second device in a second subframe on the basis of the
(Continued)

scheduling message, wherein the scheduling message includes an instructor instructing the direct D2D communication.

10 Claims, 19 Drawing Sheets

Related U.S. Application Data filed on Jan. 11, 2013, provisional application No. 61/761,219, filed on Feb. 5, 2013.

(52) U.S. Cl.
CPC .......... *H04L 5/0048* (2013.01); *H04L 5/0053* (2013.01); *H04L 5/0055* (2013.01); *H04W 72/121* (2013.01)

(56) References Cited

U.S. PATENT DOCUMENTS

2013/0155962 A1* 6/2013 Hakola ............... H04W 72/042
370/329
2013/0223356 A1* 8/2013 Khoshnevis ........ H04W 72/042
370/329
2014/0018010 A1* 1/2014 Gao .................... H04W 76/023
455/67.13

FOREIGN PATENT DOCUMENTS

| KR | 10-2009-0062435 | 6/2009 |
| WO | 2010111428 | 9/2010 |
| WO | 2010/139847 | 12/2010 |
| WO | 2011/129537 | 10/2011 |
| WO | 2012/019348 | 2/2012 |
| WO | 2012/035367 | 3/2012 |

OTHER PUBLICATIONS

PCT International Application No. PCT/KR2013/003299, Written Opinion of the International Searching Authority dated Jul. 24, 2013, 10 pages.
The State Intellectual Property Office of the People's Republic of China Application Serial No. 201380020836.1, Office Action dated Oct. 31, 2016, 14 pages.

* cited by examiner

FIG. 2
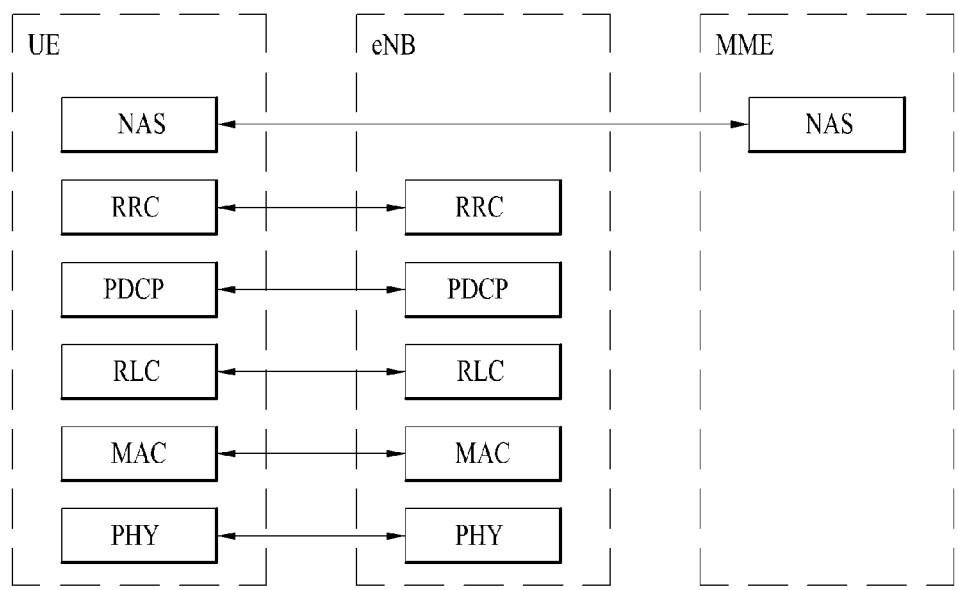
(a) Control - Plane Protocol Stack
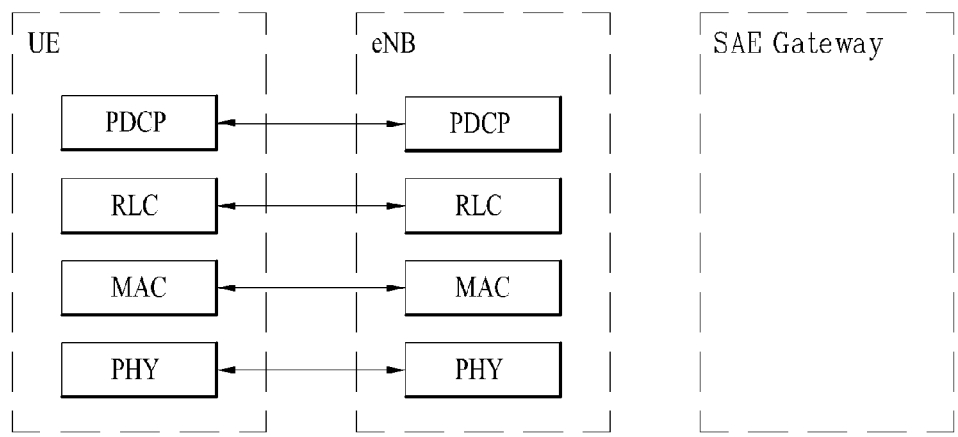
(b) User - Plane Protocol Stack

METHOD FOR TRANSMITTING CONTROL INFORMATION FOR DIRECT D2D COMMUNICATION IN WIRELESS COMMUNICATION SYSTEMS, AND APPARATUS FOR SAME

CROSS-REFERENCE TO RELATED APPLICATIONS

This application is the National Stage filing under 35 U.S.C. 371 of International Application No. PCT/KR2013/003299, filed on Apr. 18, 2013, which claims the benefit of U.S. Provisional Application Ser. No. 61/635,845, filed on Apr. 19, 2012, 61/751,268, filed on Jan. 11, 2013 and 61/761,219, filed on Feb. 5, 2013, the contents of which are all hereby incorporated by reference herein in their entirety.

TECHNICAL FIELD

The present invention relates to a wireless communication system, and more particularly to a method and apparatus for transmitting control information needed for D2D (Device-to-Device) direct communication in a wireless communication system, and an apparatus for supporting the same.

BACKGROUND ART

As a representative example of a wireless communication system of the present invention, 3$^{rd}$ Generation Partnership Project Long Term Evolution (3GPP LTE) and LTE-Advanced (LTE-A) communication systems will hereinafter be described in detail.

FIG. 1 is a conceptual diagram illustrating an Evolved Universal Mobile Telecommunications System (E-UMTS) network structure as an exemplary mobile communication system. In particular, the Evolved Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110a and 110b, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARQ)-related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new features and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for new or improved wireless access technology.

DISCLOSURE

Technical Problem

An object of the present invention is to provide a method and apparatus for transmitting control information for D2D direct communication in a wireless communication system.

Technical Solution

The object of the present invention can be achieved by providing a method for performing Device-to-Device (D2D) direct communication by a first user equipment (UE) in a wireless communication system including: detecting a scheduling message in a plurality of first subframes in which a search region of the scheduling message for the D2D direct communication is activated; and performing D2D direct communication with a second user equipment (UE) at a second subframe, upon receiving the scheduling message, wherein the scheduling message includes an indicator for indicating D2D direct communication. The scheduling message may be detected throughout at least two subframes from among the plurality of first subframes.

The scheduling message may include specific information indicating whether the first UE is a transmitter or receiver of the D2D direct communication. The scheduling message may include a specific field for transmit (Tx) power control, wherein the specific field is control information of data transmit (Tx) power of the D2D direct communication when the first UE is used as the transmitter of the D2D direct communication, and the specific field is control information of transmit (Tx) power of a response signal to reception data of the D2D direct communication when the first UE is used as the receiver of the D2D direct communication.

The scheduling message may be used to schedule the D2D direct communication for use in a predetermined number of second subframes. The scheduling message may be used to schedule the D2D direct communication for use in the second subframes until information indicating invalidity of the scheduling message is received from a base station (BS).

The method may further include: transmitting an ACKnowledgment/Negative ACKnowledgment (ACK/NACK) signal of the scheduling message to the base station (BS). The ACK/NACK signal may be transmitted from the same second subframe as in the D2D direct communication.

The ACK/NACK signal may be transmitted prior to the second subframe in which the D2D direct communication is performed.

The search region of the scheduling message for the D2D direct communication and a search region of a scheduling message for communication between the first user equipment (UE) and a base station (BS) may coexist in each of the first subframes. The length of the scheduling message for the D2D direct communication may be identical to the length of the scheduling message for the communication between the first UE and the BS.

The scheduling message for the D2D direct communication may be transmitted from a base station (BS).

In accordance with another aspect of the present invention, a user equipment (UE) device for performing Device-to-Device (D2D) direct communication in a wireless communication system includes: a radio frequency (RF) communication module configured to transmit/receive a radio frequency (RF) signal to a base station (BS) or a counterpart UE of the D2D direct communication; a processor configured to process the RF signal, wherein the processor detects a scheduling message in a plurality of first subframes in which a search region of the scheduling message for the D2D direct communication is activated, and performs D2D direct communication with a counterpart user equipment (UE) at a second subframe on the basis of the scheduling message, wherein the scheduling message includes an indicator for indicating D2D direct communication.

Advantageous Effects

As is apparent from the above description, the embodiments of the present invention can efficiently transmit control information to implement D2D direct communication in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 2 illustrates a control plane and a user plane (U-Plane) of a radio interface protocol between a User Equipment (UE) and an E-UTRAN according to the 3GPP wireless access network standard.

BEST MODE

Figure 1:
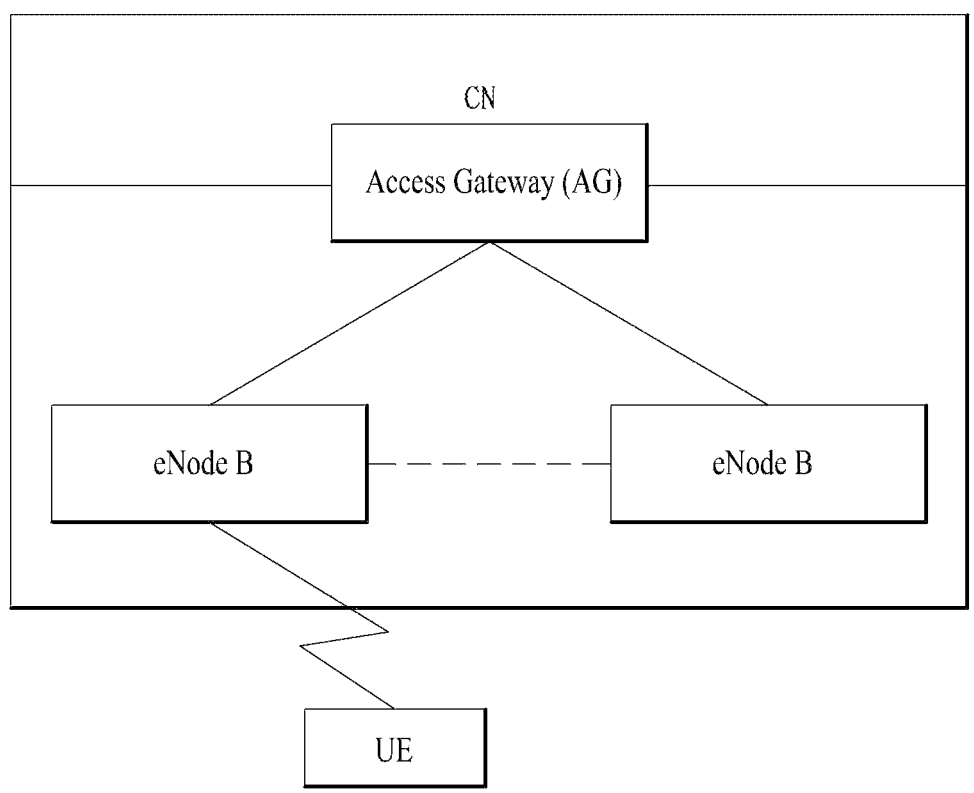
FIG. 1 is a conceptual diagram illustrating an Evolved Universal Mobile Telecommunications System (E-UMTS) network structure as an exemplary mobile communication system.

Reference will now be made in detail to the preferred embodiments of the present invention, examples of which are illustrated in the accompanying drawings. Wherever possible, the same reference numbers will be used throughout the drawings to refer to the same or like parts. The above and other configurations, operations, and features of the present invention will be easily understood from the embodiments of the invention described below with reference to the accompanying drawings. The embodiments described below are examples wherein technical features of the invention are applied to a $3^{rd}$ Generation Partnership Project (3GPP) system.

Although the embodiment of the present invention will be disclosed on the basis of an LTE system and an LTE-A system for convenience of description and better understanding of the present invention, it should be noted that the scope or spirit of the present invention is not limited thereto and can be applied to other communication systems as necessary. In addition, although the embodiment of the present invention will be disclosed on the basis of an FDD scheme as an example, the scope or spirit of the embodiment of the present invention is not limited thereto and can also be applied to H-FDD and TDD schemes as necessary.

FIG. 2 illustrates a control plane and a user plane (U-Plane) of a radio interface protocol between a User Equipment (UE) and an E-UTRAN according to the 3GPP wireless access network standard. The control plane is a passage through which control messages that a UE and a network use in order to manage calls are transmitted. The user plane is a passage through which data (e.g., voice data or Internet packet data) generated at an application layer is transmitted.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel uses time and frequency information as radio resources. In more detail, using the time and frequency information as radio resources, the physical channel is modulated according to the Orthogonal Frequency Division Multiple Access (OFDMA) scheme via a downlink, and is modulated according to the Single Carrier Frequency Division Multiple Access (SC-FDMA) scheme via an uplink.

The MAC layer of the second layer provides a service to a Radio Link Control (RLC) layer, located above the MAC layer, through a logical channel. The RLC layer of the second layer enhances data transmission reliability. The functions of the RLC layer may also be implemented through internal functional blocks of the MAC layer. A PDCP layer of the second layer performs a header compression function to reduce unnecessary control information in order to efficiently transmit IP packets such as IPv4 or IPv6 packets over a radio interface with a relatively narrow bandwidth.

A Radio Resource Control (RRC) layer located at the lowest part of the third layer is defined only in the control plane and is responsible for control of logical, transport, and physical channels in association with configuration, re-configuration and release of Radio Bearers (RBs). The radio bearer (RB) is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB (eNode-B) is set to use a bandwidth such as 1.4, 3, 5, 10, 15 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). In the meantime, uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 3:
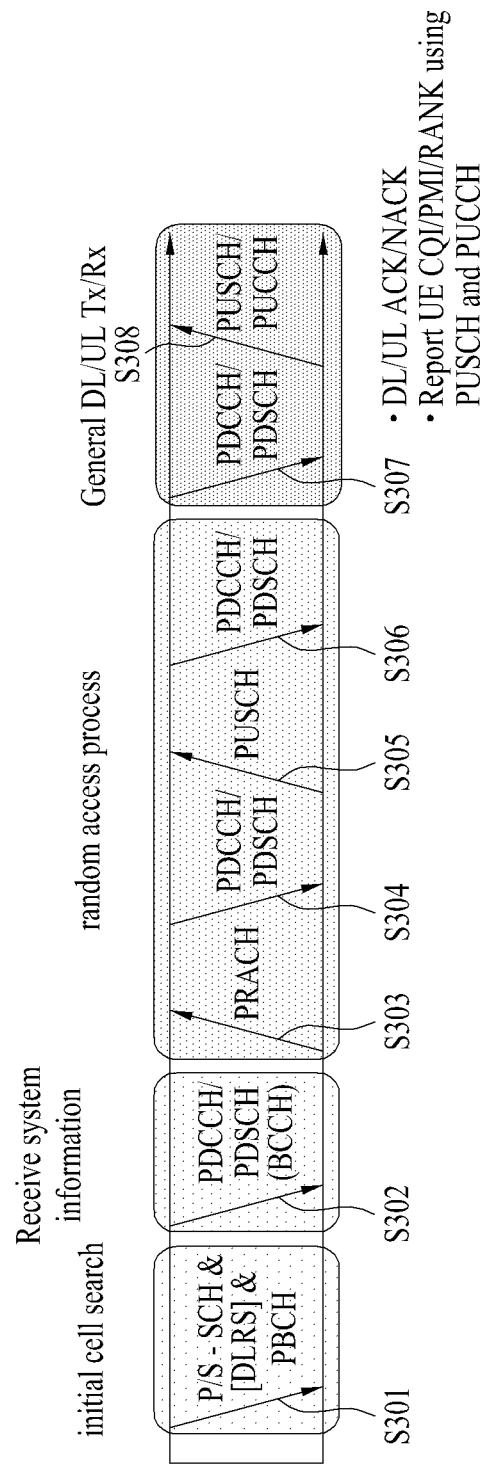
FIG. 3 is a conceptual diagram illustrating physical channels used in a 3GPP LTE system as an exemplary wireless communication system and a general method for transmitting a signal using the physical channels.

FIG. 3 is a conceptual diagram illustrating physical channels for use in a 3GPP system and a general method for transmitting a signal using the physical channels.

Referring to FIG. 3, when powered on or when entering a new cell, a UE performs initial cell search in step S301. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After initial cell search, the UE may acquire more specific system information by receiving a Physical Downlink Control CHannel (PDCCH) and receiving a Physical Downlink Shared CHannel (PDSCH) based on information of the PDCCH in step S302.

On the other hand, if the UE initially accesses the BS or if the UE does not have radio resources for signal transmission, it may perform a random access procedure to the BS in steps S303 to S306. For the random access, the UE may transmit a predetermined sequence as a preamble to the BS on a Physical Random Access CHannel (PRACH) in steps (S303~S306) and receive a response message for the preamble on a PDCCH and a PDSCH corresponding to the PDCCH in steps S304 and S306. In the case of contention-based RACH, the UE may perform a contention resolution procedure.

After the foregoing procedure, the UE may receive a PDCCH and a PDSCH in step S307 and transmit a Physical Uplink Shared CHannel (PUSCH) and a Physical Uplink Control CHannel (PUCCH) in step S308, as a general downlink/uplink (DL/UL) signal transmission procedure. Specifically, the UE may receive downlink control information (DCI) through a PDCCH. In this case, DCI includes control information such as resource allocation information for the UE, and has different formats according to usage purposes.

On the other hand, uplink control information transmitted from the UE to the BS or downlink control information transmitted from the UE to the BS may include a downlink (DL) or uplink (UL) ACKnowledgement/Negative ACKnowledgment (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

Figure 4:
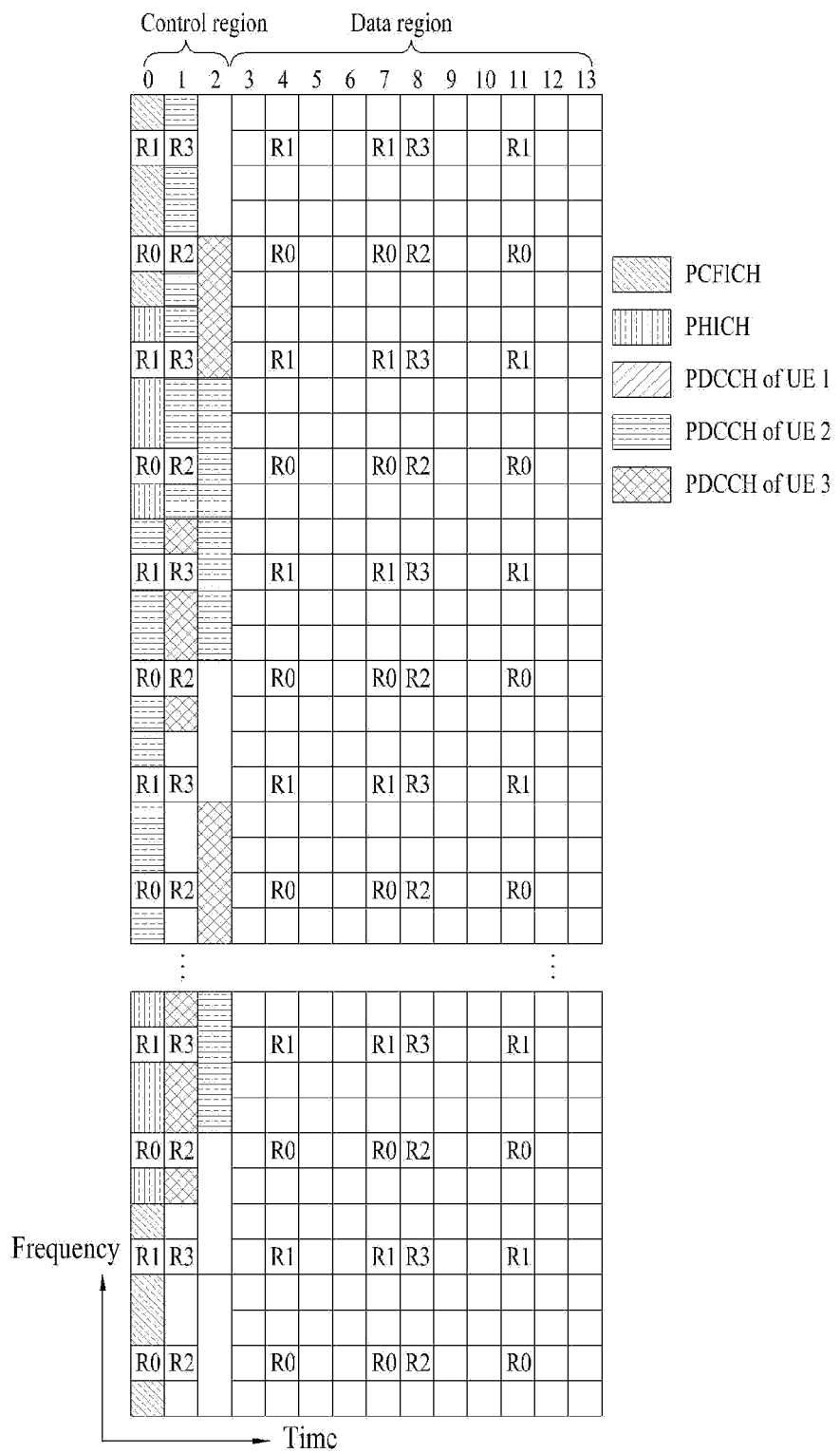
FIG. 4 is a conceptual diagram illustrating a downlink radio frame for use in an LTE system.

FIG. 4 shows a control channel contained in a control region of one subframe in a downlink radio frame according to one embodiment of the present invention.

Referring to FIG. 4, one subframe includes 14 OFDM symbols. First to third ones of the 14 OFDM symbols may be used as a control region, and the remaining OFDM symbols (i.e., 11 to 13 OFDM symbols) may be used as a data region. In FIG. 4, R1 to R4 represent reference signals (RSs) (also called pilot signals) of antennas 0 to 3, respectively. In a general subframe, RSs of the antennas 0 to 3 are fixed to a predetermined pattern irrespective of a control region and a data region. The control channel is allocated to a resource, to which the RS is not allocated, in the control region. A traffic channel is allocated to a resource, to which the RS is not allocated, in the data region. A variety of control channels may be allocated to the control region, for example, a physical control format indicator channel (PCFICH), a physical hybrid-ARQ indicator channel (PHICH), a physical downlink control channel (PDCCH), etc.

PCFICH is used as a physical control format indicator channel, and informs the UE of the number of OFDM symbols used for PDCCH at every subframe. PCFICH is located at a first OFDM symbol, and is established to have priority over PHICH and PDCCH. PCFICH includes 4 resource element groups (REGs), and individual REGs are distributed into the control region on the basis of a cell ID. One REG includes four REs. The RE is a minimum physical resource defined by 'one subcarrier×one OFDM symbol'. The PCFICH value indicates values of 1 to 3 or values of 2 to 4 according to bandwidth, and is QPSK (Quadrature Phase Shift Keying)-modulated.

PHICH is used as a physical HARQ (Hybrid-Automatic Repeat and reQuest) indicator channel, and carries HARQ ACK/NACK signals for uplink transmission. In other words, PHICH indicates a channel for transmitting DL ACK/NACK information for UL HARQ. The PHICH includes one REG, and is cell-specifically scrambled. An ACK/NACK signal indicated by one bit is BPSK (Binary Phase Shift Keying)-modulated. The modulated ACK/NACK is spread with a spreading factor (SF) of 2 or 4. Several PHICHs mapped to the same resources construct a PHICH group. The number of PHICHs multiplexed in the PHICH group may be determined according to the number of spreading codes. PHICH (or PHICH group) may be repeated three times so as to obtain a diversity gain from a frequency domain and/or a time domain.

PDCCH acting as a physical downlink control channel is allocated to N first OFDM symbols of a subframe. In this case, N is an integer of 1 or higher and is indicated by a PCFICH. PDCCH includes one or more CCEs. PDCCH may inform each UE or a UE group of information related to resource allocation of PCH (Paging Channel) and DL-SCH (Downlink-shared channel), uplink scheduling grant, HARQ information, etc. The PCH and the DL-SCH are transmitted through a PDSCH. Therefore, the BS and the UE may transmit and receive data other than either specific control information or specific service data through the PDSCH.

Information indicating which UE will receive data as an input, information indicating how the UEs receive PDSCH data, and information indicating whether decoding is carried out are contained in the PDCCH. For example, it is assumed that a specific PDCCH is CRC-masked with a Radio Network Temporary Identity (RNTI) called 'A', and information that is transmitted using radio resources 'B' (for example, a frequency location) and transmission format information 'C' (for example, a transmission block size, a modulation scheme, coding information, etc.), is transmitted through a specific subframe. In this case, a UE located in a cell monitors a PDCCH using its own RNTI information. If at least one UE having the RNTI 'A' is present, the UEs receive PDCCH and receive PDSCH indicated by 'B' and 'C' through the received PDCCH information.

REG which is the basic resource unit of a DL control channel is composed of four neighbor REs in a state of excluding the RS. The PCFICH and the PHICH include four REGs and three REGs, respectively. The PDCCH is composed of CCE units and one CCE includes 9 REGs.

The UE is set to confirm M (L) (≥L) CCEs which are arranged consecutively or according to a specific rule in order to determine whether a PDCCH composed of L CCEs is transmitted to the UE. The value L considered when the UE receives the PDCCH may be plural. A set of CCEs which should be confirmed when the UE receives the PDCCH is referred to as a PDCCH search space. For example, in the LTE system, the PDCCH search space is defined as shown in Table 1.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 1, L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is referred to as PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total time/frequency region of the control region of a subframe. As a control channel is configured in units of a CCE but interleaved in units of an REG, frequency diversity gain and interference randomization gain may be maximized.

Figure 5:
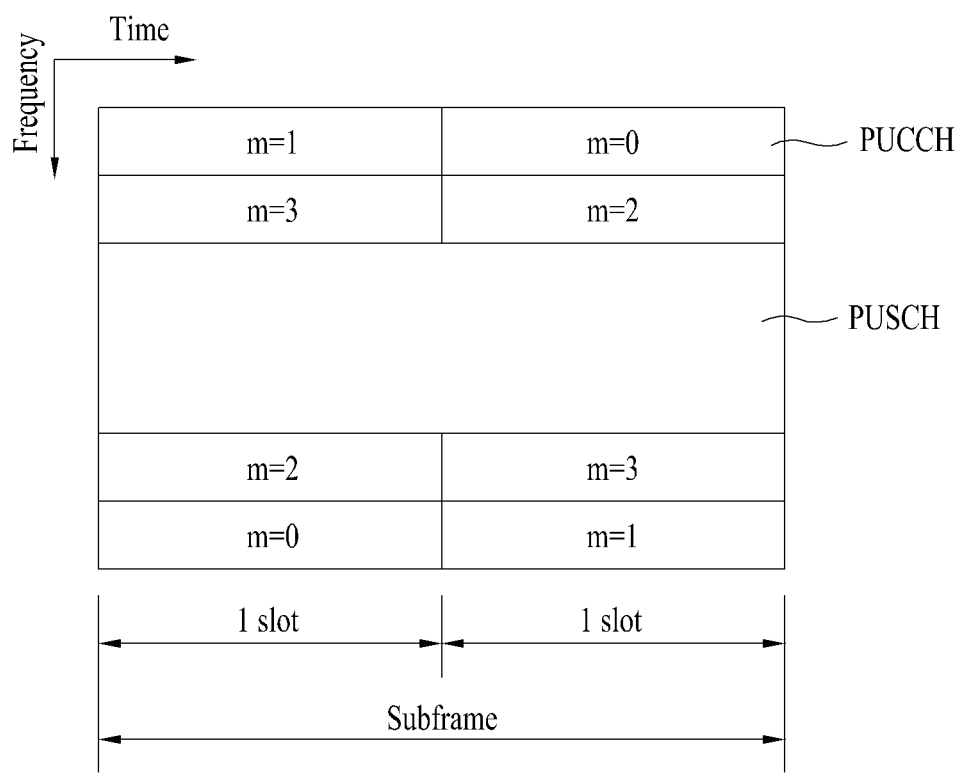
FIG. 5 is a conceptual diagram illustrating an uplink radio frame for use in an LTE system.

FIG. 5 illustrates a structure of a UL subframe in LTE.

Referring to FIG. 5, a UL subframe may be divided into a region to which a physical uplink control channel (PUCCH) carrying control information is allocated and a region to which a physical uplink shared channel (PUSCH) carrying user data is allocated. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, and a scheduling request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

Figure 6:
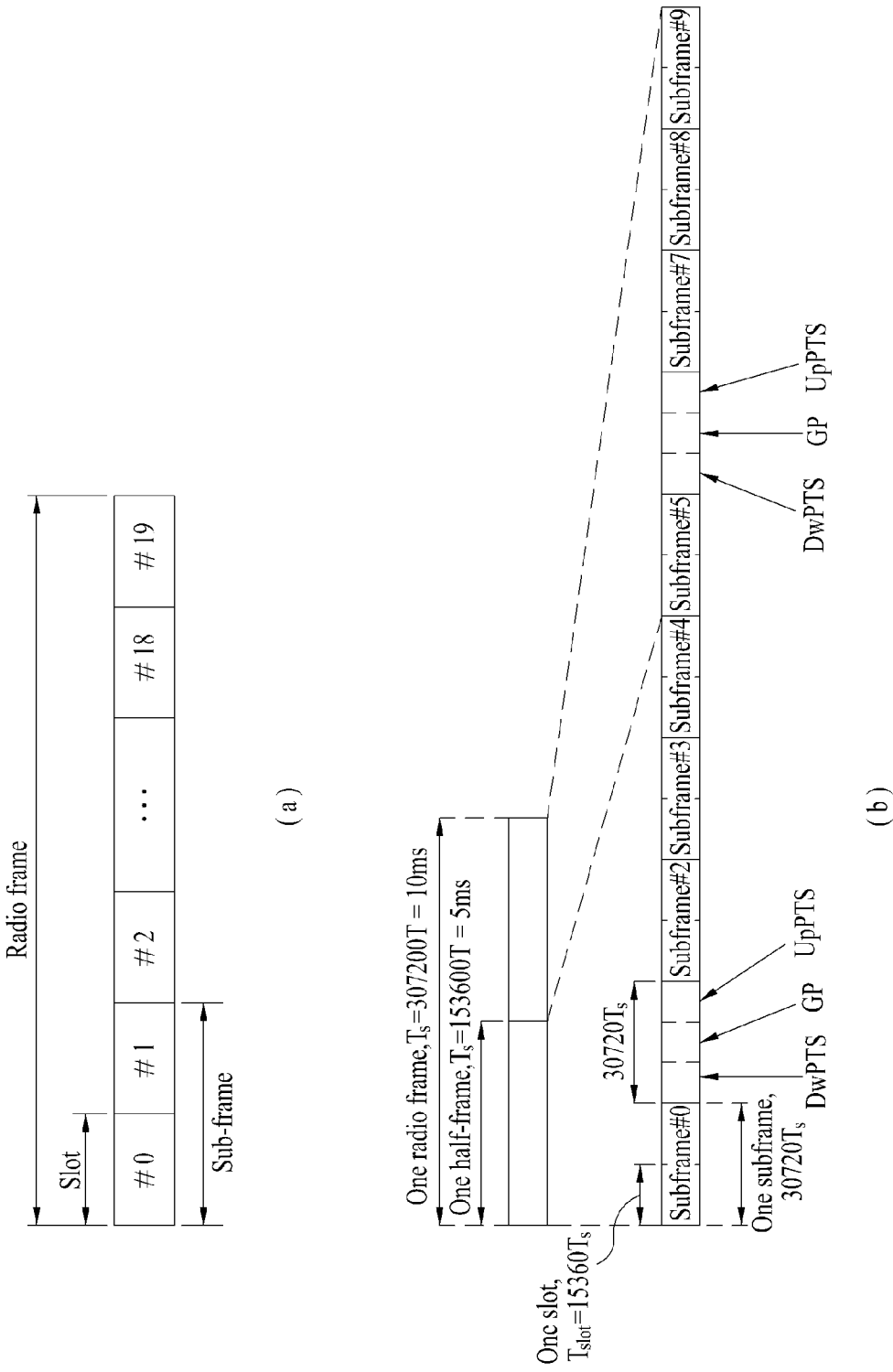
FIG. 6 is a diagram illustrating a structure of a radio frame for use in a Long Term Evolution (LTE) TDD system.

FIG. 6 is a diagram illustrating a structure of a radio frame for use in LTE TDD The radio frame for use in LTE TDD includes two half frames, each half frame including 4 subframes each having 2 slots and a special subframe having a Downlink Pilot Time Slot (DwPTS), a Guard Period (GP), and an Uplink Pilot Time Slot (UpPTS).

In the special subframe, DwPTS is used for initial cell search, synchronization, or channel estimation at a UE. UpPTS is used for an eNB to perform channel estimation and acquire UL synchronization with a UE. In other words, DwPTS is used for DL transmission, and UpPTS is used for UL transmission. Particularly, UpPTS is used for transmitting a PRACH preamble or a Sounding Reference Signal (SRS). The GP is used to cancel UL interference between UL and DL, caused by the multi-path delay of a DL signal.

A current 3GPP standard specification defines the following configurations listed in [Table 1] below for the special subframe. Table 2 illustrates DwPTSs and UpPTSs in the case where $T_s=1/(15000 \times 2048)$. The remaining region except for a DwPTS and an UpPTS is set as a GP.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL/DL subframe configurations for LTE TDD are listed in Table 3 below.

TABLE 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 3, D represents a DL subframe, U represents a UL subframe, and S represents a special subframe. Table 2 further tabulates DL-to-UL switching periodicities for the respective UL/DL subframe configurations in each system.

In addition, Table 4 shows an uplink (UL) ACK/NACK timeline. If a UE receives a PDCCH and a PDSCH scheduled by PDCCH from the eNB at a subframe #(n−k), this means that UL ACK/NACK for the received PDSCH is transmitted at the subframe #n.

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 7:
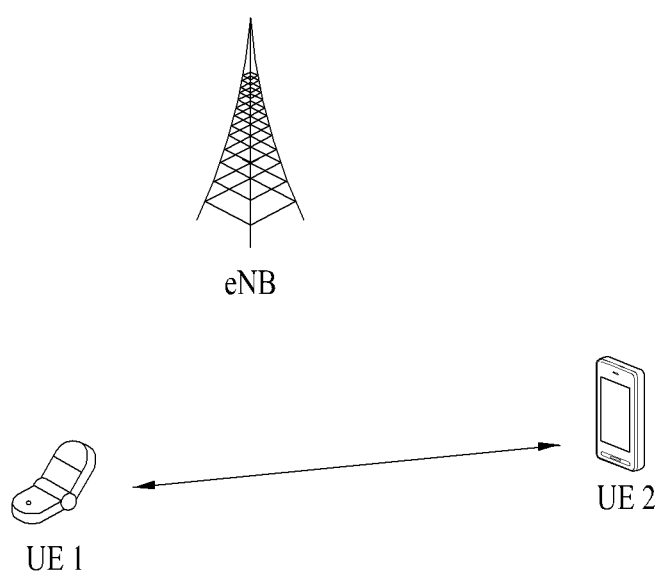
FIG. 7 is a conceptual diagram illustrating D2D direct communication.

FIG. 7 is a conceptual diagram illustrating D2D direct communication.

Referring to FIG. 7, during D2D communication (i.e., D2D direct communication) in which the UE wirelessly communicates with another UE, the eNB may transmit a scheduling message for indicating D2D transmission/reception. The UE participating in D2D communication may receive a D2D scheduling message from the eNB, and performs Tx/Rx operations indicated by the D2D scheduling message.

The UE for use in LTE attempts to detect a scheduling message of a predetermined downlink Control Information) format in a search region composed of candidates (i.e., PDCCH candidates of Table 1) of a series of scheduling messages. In addition, if a scheduling message valid for the UE is detected, the UE may perform the Tx/Rx operations needed for the scheduling message. Even in the case of D2D communication, it is preferable that the D2D scheduling message be transmitted according to a predetermined DCI format in a predetermined search region. For convenience of description and better understanding of the present invention, a predetermined search region in which the D2D scheduling message is detected is defined as a D2D search region.

First of all, the D2D search region may be designed to be distinguished from a general search region in which a scheduling message between the UE and the eNB is transmitted. This means that the D2D search region is formed using time/frequency resources different from those of the legacy search region needed for communication between the UE and the eNB. Specifically, the D2D search region may be configured using a separate CCE aggregate according to characteristics of the search region composed of CCE units. Alternatively, if the scheduling message is transmitted using a new PDCCH (e.g., Enhanced PDCCH (EPDCCH)) transmitted using some resource blocks (RBs) in a PDSCH region, the D2D search region may be configured using a separate RS aggregate defined in the PDSCH region.

As described above, if the D2D search region is formed in a separate resource region, it is preferable that only the D2D scheduling message be transmitted in the corresponding resource region. That is, the UE may detect a scheduling message for communication between the UE and the eNB through the legacy search region, and may detect a D2D scheduling message through a separate D2D search region. In addition, if the carrier aggregation (CA) scheme in which several carriers (or cells) are aggregated and configured is applied to the UE, the D2D search region may be shown as a search region of the second carrier (or cell). In this case, the UE has to monitor two search regions (i.e., the legacy search region and the D2D search region), so that the number of blind decoding (BD) times for detecting the scheduling message increases.

In addition, the D2D scheduling message may be transmitted according to a specific format different from that of the legacy scheduling message.

Generally, D2D communication is achieved only in some subframes, and the remaining subframes will be used for a communication link between the eNB and the UE, such that specific information as to which subframe will be used to activate the above D2D search region must be decided. Therefore, the following methods (1) and (2) relates to activation of the D2D search region and a method for connecting the D2D search region located in each subframe to the D2D subframe, and a detailed description thereof is as follows.

1) First of all, the D2D search region is activated only in a specific subframe, and the D2D search region defined in the specific subframe may schedule D2D communication in another subframe connected to the defined D2D search region. That is, if the subframe #n is designated as a subframe in which the D2D search region is activated, the D2D scheduling message transmitted in the corresponding subframe may control D2D communication at the subframe #(n+k) (where, k=0, 1, . . . ).

In this case, an aggregate of subframes in which the D2D search region is activated and/or an aggregate of subframes in which D2D communication is achieved may be transmitted to the UE through higher layer signaling such as RRC signaling. If the relationship between the aggregate of subframes in which the D2D search region is activated and the aggregate of subframes in which D2D communication is achieved is predefined, one subframe aggregate is signaled so that two aggregates can be configured. In this case, the above relationship may show an exemplary case in which the value of k is fixed.

Figure 8:
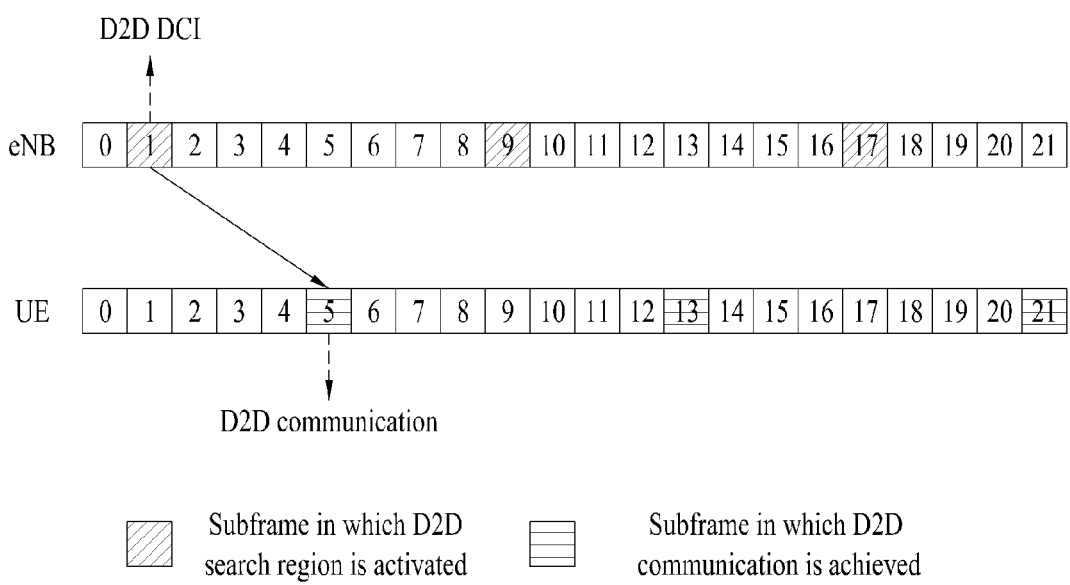
FIG. 8 is a conceptual diagram illustrating the relationship between a subframe in which a D2D scheduling message is received and a subframe in which D2D communication is achieved according to the embodiments of the present invention.

FIG. 8 is a conceptual diagram illustrating the relationship between a subframe in which a D2D scheduling message is received and a subframe in which D2D communication is achieved according to the embodiments of the present invention. Specifically, FIG. 8 assumes that a D2D scheduling message (hereinafter referred to as D2D DCI) transmitted to the subframe #n indicates D2D communication at the subframe #(n+4).

Referring to FIG. 8, the D2D search region is activated at the subframes (#1, #9, and #17), and it can be recognized that D2D DCI detected at each subframe controls D2D communication at the subframes (#5, #13, and #21). In this case, the UE may not attempt to detect D2D DCI of the remaining subframes in which the D2D search region is deactivated, power consumed for blind decoding (BD) can be reduced, and unnecessary malfunction caused by the DCI detection error can be prevented from occurring.

2) Differently from the above method (1), the D2D search region defined in one subframe may schedule D2D communication in the other subframe connected to the D2D search region, and D2D communication for use in one subframe may control the D2D search region defined in several subframes.

Figure 9:
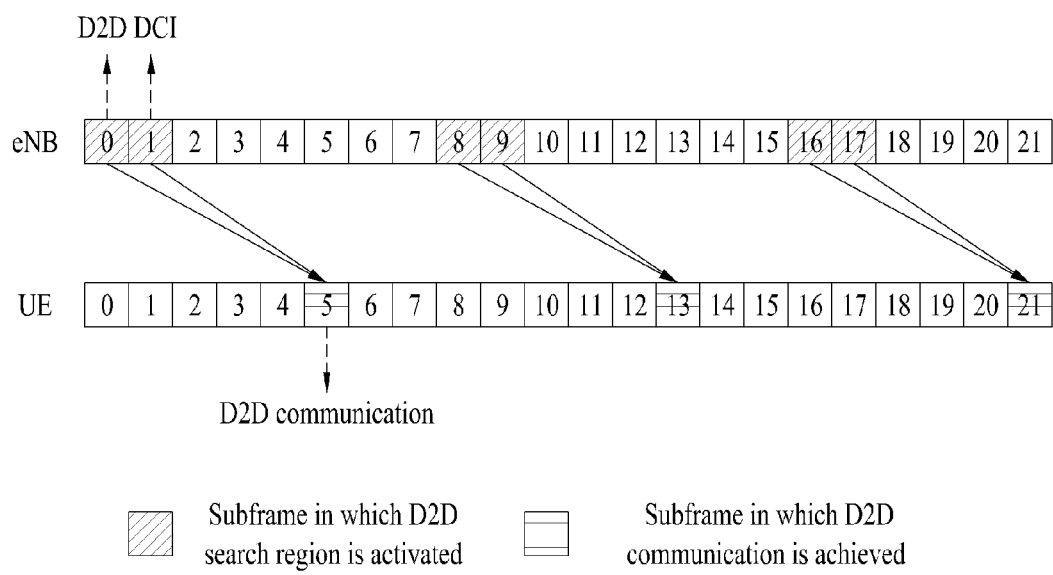
FIG. 9 is a conceptual diagram illustrating the other relationship between a subframe in which a D2D scheduling message is received and a subframe in which D2D communication is achieved according to the embodiments of the present invention.

FIG. 9 is a conceptual diagram illustrating the other relationship between a subframe in which a D2D scheduling message is received and a subframe in which D2D communication is achieved according to the embodiments of the present invention.

Compared to FIG. 8, although the subframe construction for D2D operation shown in FIG. 9 is identical to that of FIG. 9, new subframes (#0, #8 and #16) are added to the legacy subframe in which the D2D search region is activated in a different way from FIG. 8, and it can be recognized that the individual subframes may control D2D communication of the subframes (#5, #13 and #21).

In accordance with the present invention, D2D communication in one subframe is controlled through the D2D search region activated in several subframes, and signaling overhead needed for D2D communication control is not concentrated on a specific subframe and can be distributed to several subframes. For example, when D2D communication at the subframe #5 is controlled, the eNB may control some D2D communication links using D2D DCI transmitted at the subframe#0 in consideration of signaling overhead at each subframe, and may schedule some other D2D communication links using D2D DCI transmitted at the subframe #1.

Specifically, in all subframes in which the eNB can transmit D2D DCI, that is, in all subframes in which the UE attempts to detect D2D DCI, the D2D search region may be activated. For this purpose, the aggregate of subframes in which the D2D search region is activated and the aggregate of subframes in which D2D communication is performed can be signaled separately from each other. For example, the eNB may inform the UE of a first subframe aggregate. In this case, the detected D2D DCI may indicate D2D communication for use in a second subframe aggregate known to the UE. In addition, the rule indicating which subframe is used for D2D DCI transmission and which subframe is used to schedule D2D communication may be decided, and the following rules (A) to (C) may be used as the associated examples.

A) In order to guarantee a minimum time (T) in which the UE interprets/processes DCI during a predetermined time between D2D DCI transmission and D2D communication, D2D DCI transmitted at the subframe #n may be applied to a subframe #(n+T) or the next subframe to which first D2D communication is allowed. Specifically, the rule (A) may indicate the example corresponding to T=4 of FIG. 9.

B) When D2D DCI at the subframe #(n−k) is controlled, D2D communication at the subframe #n is defined in a manner that k is an element belonging to the aggregate K(n), and this aggregate K(n) may be predefined or may be given as a higher layer signal such as RRC signaling. Specifically, the aggregate K(n) for use in the TDD system may be identical to the aggregate indicating the relationship between subframes for use in a downlink or uplink HARQ. A detailed description thereof will hereinafter be described with reference to Table 3 and Table 4.

That is, the aggregate K(n) may be denoted by the aggregate of subframes for defining the value of k when ACK/NACK of PDSCH at the subframe #(n−k) is transmitted at the subframe #n, and a detailed description thereof has already been disclosed in Table 4. Alternatively, the aggregate K(n) may be derived from a specific time at which UL grant for PUSCH to be transmitted at the subframe #n is transmitted. For example, assuming that UL grant for PUSCH to be transmitted at the subframe #n is transmitted at the subframe #(n−k1), D2D DCI transmitted at the subframes (#(n−k2+1), #(n−k2+2) #(n−k1)) (i.e., the subframes in the range from the subframe #(n−k1) to the subframe #(n−k2) in which UL grant of another subframe can be transmitted in advance) may be defined to control D2D communication at the subframe #n.

C) In addition, indexes of D2D communication subframes scheduled at the successive subframes (#n, #(n−1), #(n−2), . . . ) may be sequentially and alternately allocated. Specifically, assuming that the D2D communication subframe based on D2D DCI (i.e., a transmission time of UL grant) is decided in the LTE TDD system, the above-mentioned operation can be effectively used in the case in which the subframe in which UL grant is not transmitted appears because the small number of UL subframes based on UL/DL subframe configuration.

Figure 10:
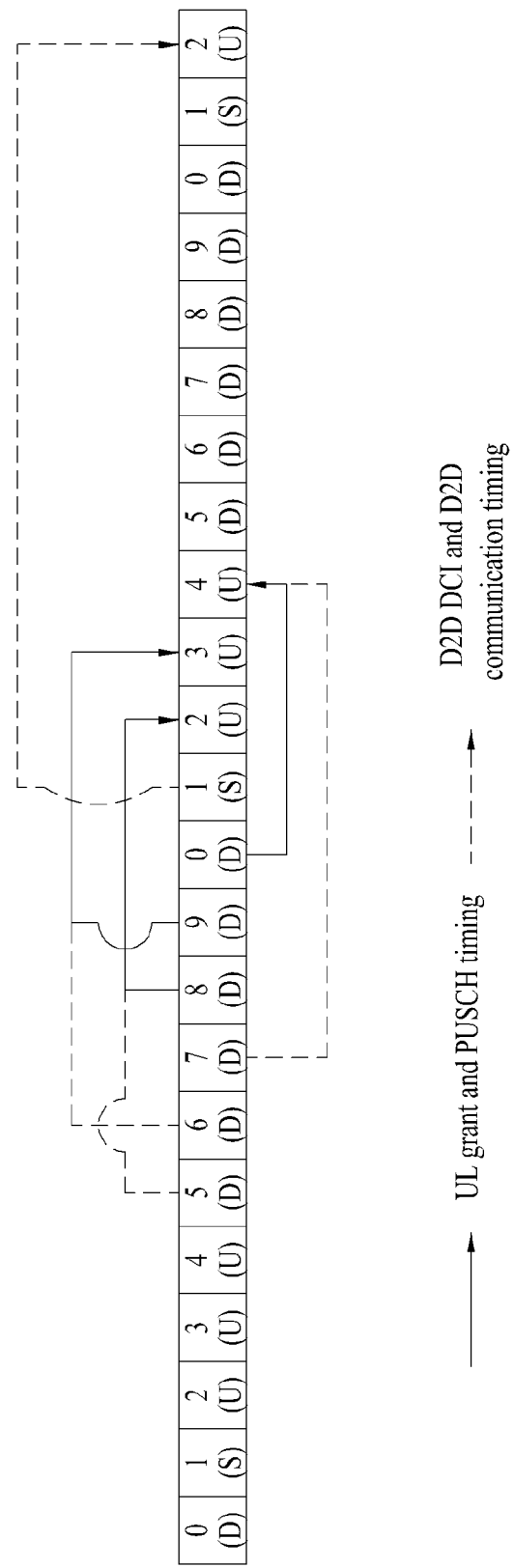
FIG. 10 is a conceptual diagram illustrating a method for alternately allocating indexes of a D2D communication subframe according to the embodiments of the present invention.

FIG. 10 is a conceptual diagram illustrating a method for alternately allocating indexes of a D2D communication subframe according to the embodiments of the present invention. Specifically, FIG. 10 assumes that UL/DL subframe configuration #3 is established.

Referring to FIG. 10, in case of UL/DL subframe configuration #3, PUSCH to be transmitted at the subframes (#2, #3, and #4) may be scheduled at subframes #8, #9, and #0, respectively. If the relationship between the UL grant and the PUSCH transmission time is re-applied to D2D DCI and D2D communication, subframe indexes interoperable with D2D DCI transmitted at the remaining DL subframe are changed one by one. That is, at the subframes (#8, #9 and #0) at which UL grant is transmitted, D2D DCI for D2D communication is transmitted at the subframes (#2, #3 and #4) according to the PUSCH timing point. Subframe links of the remaining subframes are sequentially decided so that D2D DCI for D2D communication at the subframes (#2, #3 and #4) can be transmitted at the subframes (#5, #6 and #7).

In FIG. 10, D2D DCI at the subframe #1 assumes that a DCI processing time of the UE is set to 3 ms, and D2D communication at the subframe #2 of the next radio frame of a first subframe is controlled after lapse of 3 ms.

If UE implementation becomes seriously complicated by performing separate blind decoding for D2D DCI, the D2D search region and the legacy search region are appropriately arranged so that the number of blind decoding times may remain.

For this purpose, the search space to be activated according to the subframe may be changed. For example, the eNB may inform the UE of the aggregate of subframes through higher layer signaling such as RRC signaling, the D2D search region of the corresponding subframe is activated, and all or some of the legacy search regions for a communication link between the eNB and the UE may be deactivated.

However, even in the case of using the subframe in which the D2D search region is activated, the eNB has to perform basic communication (e.g., fallback operation) with the UE using some legacy search regions to be activated. In this case, the legacy search region to be deactivated may be used as a UE-specific search space for unicast Tx/Rx scheduling of the UE. In this case, the eNB may communicate with the UE through a common search space.

Alternatively, a search region corresponding to a specific aggregation level, for example, a search region having "aggregation level=1" or "aggregation level=2" is deactivated so that the resultant search region is used as a D2D search region, and a scheduling message for communication between the eNB and the UE may be transmitted using the search region of the remaining aggregation levels. Of course, the search region having "aggregation level=1 or 2" is used for communication between the eNB and the UE, and the search region of the remaining high aggregation levels is deactivated so that the resultant search region may be used as the D2D search region. Assuming that the low aggregation-level search region is deactivated and the high aggregation-level search region remains activated for communication between the eNB and the UE, communication between the eNB and the UE can be scheduled even in the case in which a channel state is deteriorated. In contrast, assuming that the high aggregation-level search region is deactivated and the low aggregation-level search region remains activated for communication between the eNB and the UE, DCI for a communication link between the eNB and the UE can be transmitted at low overhead even at the subframe in which D2D DCI can be transmitted.

Alternatively, a specific DCI format (e.g., a Tx-mode specific DCI format) is deactivated, and other DCI formats (e.g., DCI formats used in all Tx modes, such as DCI format 0 or DCI format 1A) may be used to schedule communication between the eNB and the UE.

Alternatively, UE capability for performing blind decoding of the search region is divided, some candidates may attempt to detect DCI for communication between the eNB and the UE, and the remaining candidates may attempt to detect D2D DCI. In this case, the subframe in which the D2D search region is activated may be configured to be matched to the UL HARQ process.

For example, in the LTE FDD system in which PUSCH transmitted at the subframe #n is retransmitted at the subframe #(n+8), the D2D search region may be activated at intervals of 8 ms. It may be difficult to concurrently perform D2D communication and communication between the UE and the eNB, and a time interval in which the D2D search region is formed coincides with one UL HARQ process, so that communication between the UE and the eNB affected by D2D communication can be minimized.

Needless to say, if a large number of subframes is requested for D2D communication, the D2D search region may be formed in the subframe corresponding to a plurality of UL HARQ processes. In more detail, there is a high possibility that D2D communication is achieved at the UL subframe, and there is also a high possibility that UL transmission from the UE to the eNB is limited at the subframe in which D2D communication is achieved. Therefore, DCI format acting as UL grant for scheduling PUSCH transmission is deactivated, and blind decoding (BD) capability corresponding to the DCI format may be used to detect D2D DCI. In addition, DCI format 4 in which the scheduling message optimized for MIMO transmission on uplink may be used as an example of the deactivated UL grant. Therefore, if MIMO-based UL Tx mode is configured, DCI format 4 may be first deactivated at the corresponding subframe. In contrast, if the MIMO-based UL Tx mode is not configured, DCI format corresponding to the next priority may be deactivated, and the Tx-mode specific DCI format in downlink may be used as the above-mentioned example.

In the subframe in which D2D DCI can be transmitted, a reference for selecting the legacy search region to be deactivated may also be shown as a combination of the above-mentioned references. For example, assuming that there is a low possibility that DCI optimized for a specific Tx mode will be transmitted at a communication link between the eNB and the UE in the subframe in which D2D DCI can be transmitted, the Tx-mode specific DCI format may be deactivated. However, the Tx-mode specific DCI format for a relatively high aggregation level is activated as in the aggregation level of 4 or 8, the Tx-mode specific DCI format will be transmitted during communication between the eNB and the UE at a relatively low probability. As a result, the Tx-mode specific DCI format having a low aggregation level is deactivated, and D2D DCI detection may be attempted at the blind decoding (BD) capability corresponding to the deactivated result. In this case, if the eNB transmits the Tx-mode specific DCI format at a communication link between the eNB and the UE, only the high aggregation level may be used. However, assuming that there is a low possibility that the Tx-mode specific DCI format for communication between the eNB and the UE will be transmitted at the subframe in which D2D DCI can be transmitted, this means that signaling overhead is not substantially large.

Besides, considering various combinations, such as specific information as to whether a common search region or a UE-specific search region is used, the presence or absence of a high or low aggregation level, the DCI format types, etc. the legacy search region to be deactivated can be defined in the subframe in which D2D DCI can be transmitted.

In addition, a specific search region from among the legacy search regions may be partially deactivated. For example, if the search region of a specific aggregation level or the search region of a specific DCI format is deactivated, the corresponding aggregation levels or some parts of DCI format are deactivated, and the remaining aggregation level or candidate may remain activated. In this case, a communication link between the eNB and the UE may be scheduled using the activated aggregation level or candidate. In this case, if M candidates having a specific aggregation level of a specific DCI format are present (however, it is assumed that indexes of the candidates are 0, 1, . . . , M−1), the positions of M' candidates to be deactivated may be determined by the following methods i) to iii).

i) First, M' candidates may be deactivated either in descending or ascending numerical order of the candidate indexes.

ii) Alternatively, indexes of M' deactivated candidates can be evenly distributed. For example, the indexes of the deactivated candidates may be defined as $$m' = \left\lfloor \frac{M \cdot x}{M'} \right\rfloor (\text{where}, \ x = 0, 1, \ldots, M' - 1).$$

In this equation, $\lfloor X \rfloor$ is a function indicating "Maximum integer≤X". Specifically, the above-mentioned method can be efficiently used for EPDCCH based on localized transmission in which one DCI candidate may highly appear in one PRB pair, and the remaining candidates left after deactivation completion are evenly distributed in the entire PRB region, so that all candidates are prevented from entering a bad channel state in the frequency selective channel.

iii) Alternatively, in order to implement more flexible eNB operations, the eNB may indicate, through higher layer signaling such as RRC signaling, the legacy search region to be deactivated in a subframe in which D2D DCI can be transmitted, or may also indicate how many candidates will be deactivated.

As another method for maintaining the number of blind decoding (BD) times, D2D DCI may be defined to have the same length as that of the legacy scheduling message. In this case, a separate D2D search region is not present, the UE detects a scheduling message from the legacy search region, and can recognize whether the corresponding scheduling message is set to either D2D DCI or a scheduling message for communication between the UE and the eNB by a specific indicator.

As an example of the above special indicator, a cross-carrier indication field (CIF) used for cross-carrier scheduling may be used in a situation to which the carrier aggregation (CA) scheme is applied. That is, a reserved state is present in the current standard documents. If a specific state decided by RRC signaling is configured, the corresponding scheduling message may be interpreted as a scheduling message for D2D communication (i.e., D2D DCI). Of course, a field having attributes similar to those of CIF is added, and it is also possible for the corresponding DCI to discriminate between a scheduling message for D2D communication and another scheduling message for communication between the eNB and the UE according to a state indicated by the added field.

Figure 11:
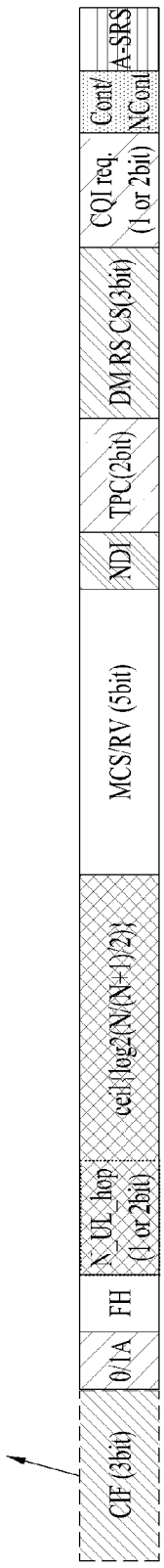
FIG. 11 is a conceptual diagram illustrating an exemplary D2D DCI format according to the embodiments of the present invention.

FIG. 11 is a conceptual diagram illustrating an exemplary D2D DCI format according to the embodiments of the present invention.

Referring to FIG. 11, the legacy DCI format 0 of D2D DCI is used, and a target communication direction of the scheduling message can be indicated using CIF. Since D2D communication is similar to PUSCH transmission in terms of a UE acting as a signal transmission entity, DCI format (e.g., DCI format 0 or DCI format 4) indicating PUSCH transmission may be properly used.

Alternatively, a target communication direction of the scheduling message may be indicted using the zero padding bit present in DCI format 0. For example, if the zero padding bit is set to zero '0', the zero padding bit of 0 is interpreted as a scheduling message indicating PUSCH transmission to the eNB. If the zero padding bit is set to the other specific state, this zero padding bit may be interpreted as a message for D2D scheduling.

On the other hand, although D2D DCI is defined to have a format different from that of the legacy DCI, the basic DCI detection operation can simplify UE implementation in the same manner as in the legacy DCI format. Of course, if separate blind decoding for D2D DCI is not performed, the length and format of D2D DCI must be maintained in the same manner as in the legacy DCI format.

An exemplary method for attaching the CRC bit masked using C-RNTI to the scheduling message will hereinafter be described in detail. A legacy scheduling message may be completed by attaching the CRC bit masked using C-RNTI of the UE (acting as a receiver of the corresponding scheduling message) to the scheduling message. Therefore, assuming that the CRC bit masked with UE's C-RNTI is present when the UE detects the scheduling message, the UE performs the CRC detection operation. In this case, if no error occurs, the presence of a scheduling message to be used for the UE can be confirmed. If such attributes are applied to D2D DCI, at least two UEs including Tx/Rx UEs participate in D2D, so that there is a need to decide specific information indicating which UE will be used for C-RNTI to be used for masking the CRC bit.

For example, the CRC bit of D2D DCI may receive the corresponding scheduling message, and may be masked with C-RNTI of the UE that is scheduled to perform the D2D transmission operation. In this case, the UE that has detected the corresponding message can recognize the fact that the UE is scheduled to perform D2D signal transmission according to the corresponding scheduling message. In addition, reception (Rx) UEs having the possibility of receiving signals of the corresponding UE are defined to receive the D2D signal of the UE employing the corresponding C-RNTI, on the condition that a message based on C-RNTI of the transmit (Tx) UE is detected when the Rx UEs attempt to detect the scheduling message using the C-RNTI of the corresponding Tx UE.

In contrast, one Tx UE and several Rx UEs may concurrently perform D2D communication. In this case, it is also possible to indicate the C-RNTI of the Rx UE corresponding to the corresponding scheduling message using a specific field of D2D DCI. CIF may be used as an indicator for indicating C-RNTI of the Rx UE. Alternatively, some bits of a Resource Allocation (RA) field, a Modulation and Coding Scheme (MCS) field, and a DeModulation-Reference Signal (DM-RS) CS (Cyclic Shift) field from among various legacy fields are reduced, and the index of a reception UE may be indicated using the corresponding bit. The above-mentioned operation may indicate that the operation related to the field having a reduced number of bits may be slightly limited. For example, assuming that some bits from among the DM-RS CS fields are reduced and the indicator of the Rx UE index is added, this means that the number of aggregates of DM-RS CSs available for D2D communication is reduced.

Alternatively, if the specific DM-RS CS and the Rx UE index are interconnected through higher layer signaling such as RRC signaling, the UE scheduled to receive a D2D transmission message transmitted by a specific Tx UE employing a specific DM-RS CS may be decided in advance. Alternatively, assuming that frequency hopping and/or CQI reporting is not present in a transmission situation of the D2D signal (or assuming that frequency hopping and/or CQI reporting is always present), the frequency hopping or the CQI request field may be used as an indicator of the Rx UE index. Alternatively, it is assumed that non-continuous resource allocation for D2D communication is not present, and a field for indicating continuity or discontinuity of resource allocation may be used as an indicator for the Rx UE index.

Of course, the indicator of the Rx UE index may be used to indicate whether the corresponding DCI is used either for communication between the UE and the eNB or for D2D communication with a specific UE. That is, if the corresponding field is not linked to a specific UE index, communication between the UE and the eNB may be performed according to the legacy corresponding field interpretation.

In the meantime, a D2D communication pair composed of a pair of each Tx UE and each Rx UE is defined, several D2D communication pairs are configured as a single D2D communication group, and one C-RNTI may be assigned to each group. That is, the UE detects D2D DCI using C-RNTI assigned to the D2D communication group including a D2D communication pair to which the UE belongs. Thereafter, it is determined whether the UE is scheduled to perform data transmission through the corresponding scheduling using a predetermined indicator field contained in D2D DCI, is scheduled to perform data reception, or it is also determined whether the corresponding scheduling message relates to a D2D communication pair including the UE.

For this purpose, D2D DCI has to include an indicator field for indicating the index of the Tx UE and the index of the Rx UE. Through signaling from the eNB, each UE must recognize whether the UE belongs to a D2D communication group having a certain C-RNTI in advance, and must also recognize which UE index is assigned to the corresponding group. In addition, a method for indicating the indexes of the Tx UE and the Rx UE may use one or more combinations from among the above-mentioned schemes.

In addition, D2D DCI is transmitted to each of the Tx UE and the Rx UE, and each message may be defined to have CRC bits that are masked with C-RNTI of the Tx UE and C-RNTI of the Rx UE. In this case, the indicator for indicating the Tx/Rx operation is needed for each message, and this indicator may be defined using the above-mentioned schemes. However, the TPC (Transmission Power Command) field contained in D2D DCI may be interpreted by the Tx UE and the Rx UE in different ways. A detailed description thereof will hereinafter be described with reference to the drawings.

Figure 12:
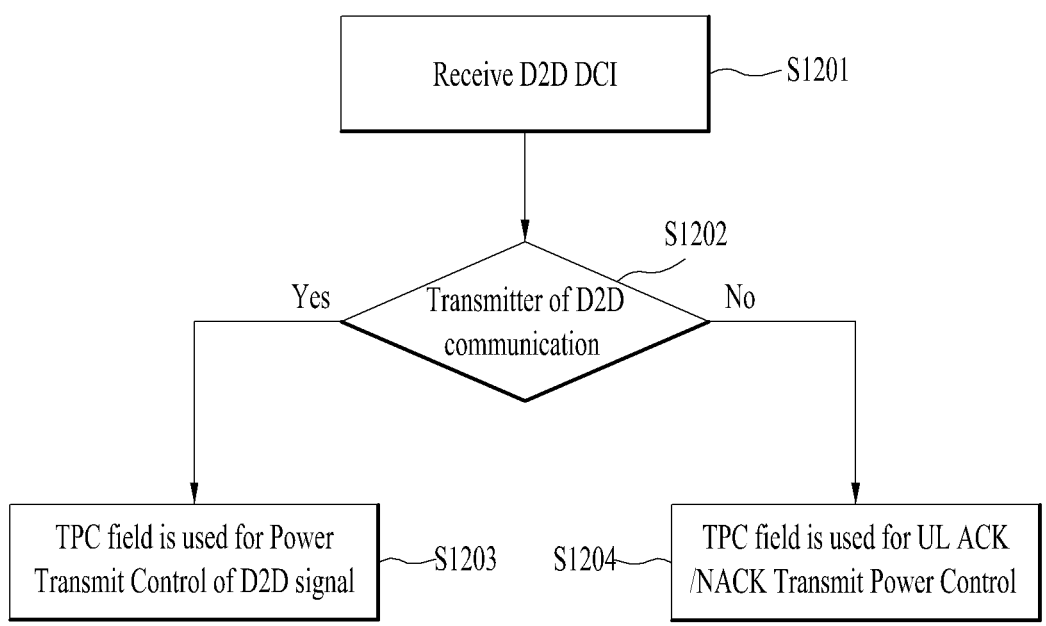
FIG. 12 is a flowchart illustrating a method for interpreting a TPC field contained in D2D DCI according to the embodiments of the present invention.

FIG. 12 is a flowchart illustrating a method for interpreting a TPC field contained in D2D DCI according to the embodiments of the present invention.

Referring to FIG. 12, if a specific UE receives D2D DCI in step 1201, the UE determines whether the UE is a transmitter of D2D communication in step 1202. If it is determined that the UE is determined to be a transmitter of D2D communication in step 1202, the corresponding UE may interpret the TPC field using a power control command of the D2D Tx signal in step 1203.

In contrast, if it is not determined that the UE is not determined to be the D2D communication transmitter in step 1202, i.e., if the UE is determined to be a receiver of D2D communication, and if an ACK/NACK signal for reporting success or failure of D2D data signal reception to the UE is transmitted over a PUCCH, this resultant signal may be interpreted as a power control command of the corresponding PUCCH.

In the above operation, assuming that ACK/NACK of the D2D data signal is transmitted in the same manner as in ACK/NACK for use in communication between the eNB and the UE, for example, if the same PUCCH resource region is selected, power control of ACK/NACK for use in communication between the eNB and the UE may also be applied to ACK/NACK power control of the D2D data signal. In contrast, if the above-mentioned signals are transmitted by different schemes using different resources, the ACK/NACK power control for D2D data may operate by power control of communication data between the eNB and the UE.

On the other hand, D2D DCI transmitted in one subframe may efficiently operate through a plurality of subframes. Specifically, if many D2D UEs are connected to one eNB, and if all D2D communication links are controlled by the eNB every time, the eNB scheduler becomes very complicated, and the amount of signaling overhead increases. A method for applying the principles of the present invention to an exemplary case in which D2D DCI of one subframe is considered valid throughout a plurality of subframes will hereinafter be described in detail.

First of all, D2D DCI transmitted in one subframe may be considered valid in as many D2D communication subframes as the predetermined number of times. That is, D2D DCI transmitted at the subframe #n may control D2D communication at A subframes corresponding to the subframes #(n+k1), #(n+k2), . . . , #(n+kA). According to this operation, D2D communication within a plurality of subframes can be controlled by only one D2D DCI transmission.

Figure 13:
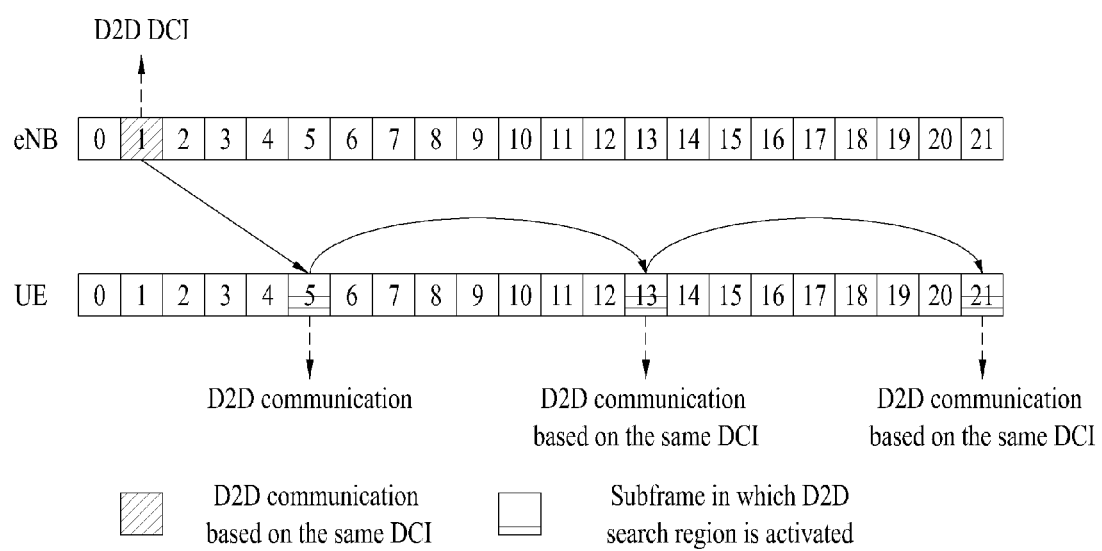
FIG. 13 is a conceptual diagram illustrating a method for allowing one D2D DCI to schedule a plurality of D2D communication subframes according to the embodiments of the present invention.

FIG. 13 is a conceptual diagram illustrating a method for allowing one D2D DCI to schedule a plurality of D2D communication subframes according to the embodiments of the present invention.

Referring to FIG. 13, D2D communication is performed at the subframes (#5, #13 and #21) according to D2D DCI of the subframe #1. In comparison between FIG. 13 and FIG. 8, the D2D search region at the subframes (#9, #17) may be deactivated, so that power consumption of blind decoding may be reduced.

The position of a D2D subframe in which D2D DCI is valid in one subframe and/or the number of D2D subframes may be transmitted through higher layer signaling such as RRC signaling. Alternatively, it may be assumed that D2D DCI is valid in one subframe before the subframe in which the D2D search region is activated appears.

In this case, if the UE operates a plurality of HARQ processes in D2D communication, the next subframe in which the D2D search region is activated may be limited to a subframe in which the D2D search region on the subframe corresponding to the same HARQ process is activated. For example, since HARQ operates in the FDD system at intervals of 8 ms, the next subframe may be limited to a subframe in which the D2D search region is activated from among a plurality of subframes shown at intervals of 8 ms. In this case, a plurality of D2D communication controlled by one D2D DCI may be configured to correspond to the subframe of the same HARQ process. For example, since HARQ operates in FDD at intervals of 8 ms, some subframes from among the subframes shown at intervals of 8 ms are controlled by one D2D DCI. In more detail, assuming that the subframe #n is controlled by D2D DCI, the same D2D DCI may control D2D at the subframes #(n+8*k), #(n+8*k*2), . . . , where k is an integer higher or lower than 1.

In the meantime, D2D DCI for D2D communication in one subframe can be transmitted in one subframe as shown in FIG. 13, or D2D DCI may also be transmitted in a plurality of subframes.

Figure 14:
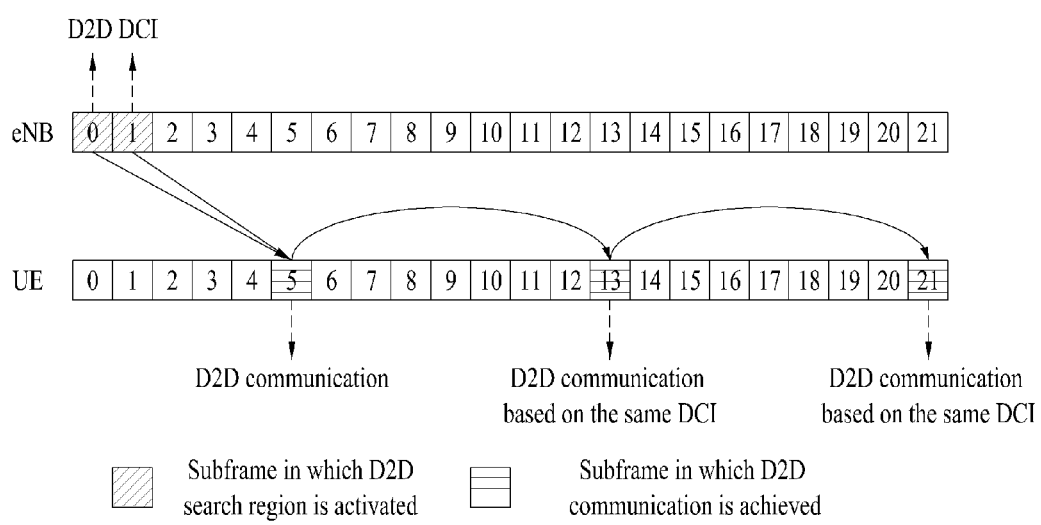
FIG. 14 is a conceptual diagram illustrating another method for allowing one D2D DCI to schedule a plurality of D2D communication subframes according to the embodiments of the present invention.

FIG. 14 is a conceptual diagram illustrating another method for allowing one D2D DCI to schedule a plurality of D2D communication subframes according to the embodiments of the present invention. Specifically, FIG. 14 assumes that one D2D DCI is transmitted throughout a plurality of subframes.

Referring to FIG. 14, D2D DCI at the subframe #5 can be first transmitted at the subframes (#0, #1), and it can be recognized that D2D DCI transmitted once is continuously valid at the subframes (#13, #21).

Alternatively, D2D DCI indicated by one subframe may be continuously valid until a separate indication message is received. Specifically, D2D DCI indicated by one subframe may be considered continuously valid in D2D communication at the subframe of one HARQ timeline. For example, assuming that HARQ occurs at intervals of 8 ms, when D2D DCI at the specific subframe #n indicates D2D communication at the subframe #(n+k), this indication may be considered valid in D2D communication corresponding to the subframe #(n+k+8m) (m=0, 1, . . . ). To change D2D communication of the corresponding UE, the eNB must retransmit D2D DCI at the subframe in which the D2D search region is activated so that it can indicate a desired operation using the retransmitted D2D DCI.

Figure 15:
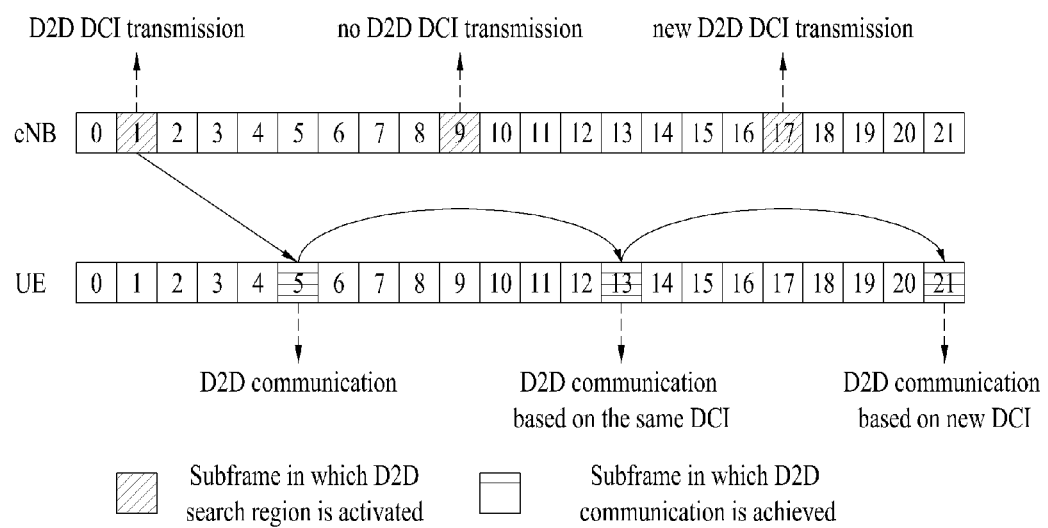
FIG. 15 is a conceptual diagram illustrating another method for allowing one D2D DCI to schedule a plurality of D2D communication subframes according to the embodiments of the present invention.

FIG. 15 is a conceptual diagram illustrating another method for allowing one D2D DCI to schedule a plurality of D2D communication subframes according to the embodiments of the present invention.

Referring to FIG. 15, after the D2D search region is activated at the subframes (#1, #9, #17), D2D DCI transmitted at the subframe #1 may schedule D2D communication at the subframe #5, and may not transmit a separate D2D DCI at the subframe #9. In this case, the UE may recognize that D2D communication at the subframe #13 is performed by the same DCI (i.e., D2D DCI transmitted at the subframe #1). Furthermore, the eNB may transmit another D2D DCI at the subframe #17, and the UE may perform D2D communication at the subframe #21 according to D2D DCI transmitted at the subframe #17. The above-mentioned operation may be modified to transmit D2D DCI for controlling D2D of one subframe in a plurality of subframes, as shown in FIG. 9 or FIG. 14.

Alternatively, instead of transmission of direct D2D DCI, the eNB may indicate whether the legacy D2D DCI is valid through a control channel occupying a smaller amount of resources. Upon receiving an indication message indicating that the legacy D2D DCi is valid, the UE continuously performs D2D communication according to the legacy DCI. In contrast, upon receiving an indication message indicating that the legacy D2D DCI is invalid, it may be preferable that D2D communication according to the legacy D2D DCI be stopped. Of source, upon receiving a new D2D DCI, the UE may also perform D2D communication.

Figure 16:
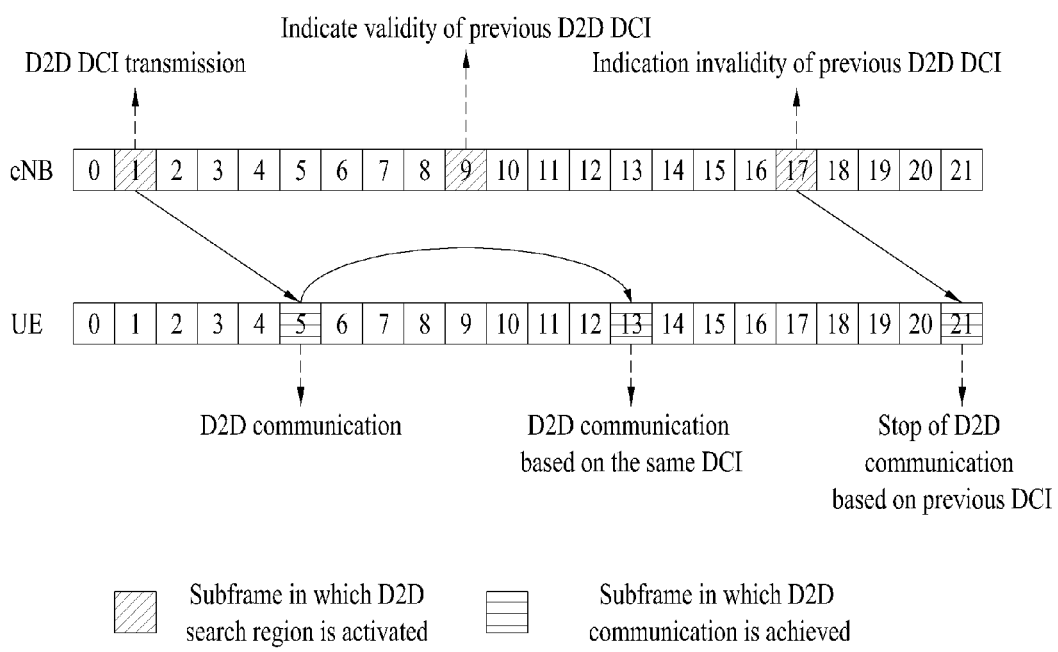
FIG. 16 is a conceptual diagram illustrating a method for transmitting validity information of previous D2D DCI according to the embodiments of the present invention.

FIG. 16 is a conceptual diagram illustrating a method for transmitting validity information of previous D2D DCI according to the embodiments of the present invention.

Referring to FIG. 16, at the subframe #9, an indicator indicating validity of D2D DCI transmitted at the subframe #1 may be transmitted. In addition, at the subframe #17, an indicator indicating that D2D DCI is no longer valid may be transmitted. In this case, at the subframe #21, D2D communication based on D2D DCI transmitted at the subframe #1 has stopped.

In this case, a channel through which the indicator is transmitted may be a PHICH acting as a control channel that occupies a smaller amount of resources than a PDCCH acting as a DCI transmission channel. That is, each of states indicated by PHICH may be used to determine whether the legacy D2D DCI is valid or not. If NACK is indicated by PHICH, PUSCH is retransmitted. If ACK is indicated, the similarity with the operation in which PUSCH retransmission is not performed can be maintained. If NACK is indicated by PHICH, this means that the legacy D2D DCI is valid. If ACK is indicated by PHICH, this means that the legacy D2D DCI is invalid. Of course, resources of PHICH to be used by each UE may be given as higher layer signaling or RRC signaling, or may be derived from resource information used for D2D communication and/or RS information.

The above-mentioned schemes may also be combined as necessary. For example, under the condition that A D2D communication times are indicated by only one D2D DCI, if an indication message indicating that the legacy D2D DCI is valid through a channel such as PHICH is received after completion of A D2D communication actions, A D2D communication actions may be performed according to the legacy D2D DCI.

Meanwhile, differently from communication between the eNB and the UE, specific information indicating whether the UE correctly receives D2D DCI may be reported to the eNB during D2D communication indicating D2D direct communication. If the UE does not receive D2D DCI, the eNB can re-transmit D2D DCI within a short time. For this purpose, if the UE receives D2D DCI, the UE may inform the eNB that the UE has correctly received D2D DCI through UL signal transmission. In this case, the UL signal transmitted by the UE may maintain the UL ACK/NACK signal indicating the success or failure of PDSCH signal reception.

In more detail, the eNB may construct PDSCH scheduling information using proper (legacy) DCI, and may transmit the PDSCH scheduling information using PDCCH or EPDCCH. Thereafter, when the UE reports the success or failure of PDSCH detection to the eNB, resources associated with PDCCH or EPDCCH used for transmission of the PDSCH scheduling information may be used. If the eNB transmits D2D DCI using specific PDCCH or EPDCCH resources, UL ACK/NACK resources associated with the corresponding PDCCH or EPDCCH become empty, so that the UE may report reception or non-reception of D2D DCI to the eNB using the empty UL ACK/NACK resources. For example, the UE having correctly received D2D DCI may transmit the same-format signal as a transmit (Tx) signal transmitted in the case in which PDSCH is correctly received, to the eNB.

If the UE performing D2D transmission and the UE performing D2D reception receive the same D2D DCI, two UEs may operate to transmit ACK/NACK using the same resources. Alternatively, in order to more correctly receive ACK/NACK of the Tx UE causing interference through reception of an actual signal, the UE configured to perform the Tx operation may be defined to transmit ACK/NACK. Alternatively, assuming that a plurality of ACK/NACK resources is connected to PDCCH/EPDCCH for D2D DCI transmission, the Tx UE and the Rx UE are used one by one, so that ACK/NACK may be transmitted.

Alternatively, assuming that ACK/NACK of D2D DCI is transmitted using specific ACK/NACK resources connected to D2D DCI, one UE may operate in a manner that predetermined ACK/NACK resources spaced apart from the specific ACK/NACK resource by a predetermined offset (e.g., one ACK/NACK resource index or two ACK/NACK resource indexes) can be used by the UE designed to transmit ACK/NACK for D2D DCI. For example, if the D2D Tx UE uses ACK/NACK resources of the index #n, the D2D Rx UE may operate to use ACK/NACK resources of the index #(n+k). In this case, 'n' may be derived from the position of a resource in which D2D DCI is transmitted, and 'k' may be a predetermined number such as 1 or 2. If the predetermined ACK/NACK resources must be used to transmit ACK/NACK for PDSCH received from the eNB, PDSCH ACK/NACK information may be concurrently transmitted along with ACK/NACK for D2D DCI by a predetermined rule.

Of course, if no ACK/NACK signal is received from ACK/NACK resources connected to D2D DCI, the eNB recognizes that the corresponding UE has wrongly received D2D DCI so that the eNB can perform the appropriate action in response to the recognized result.

Figure 17:
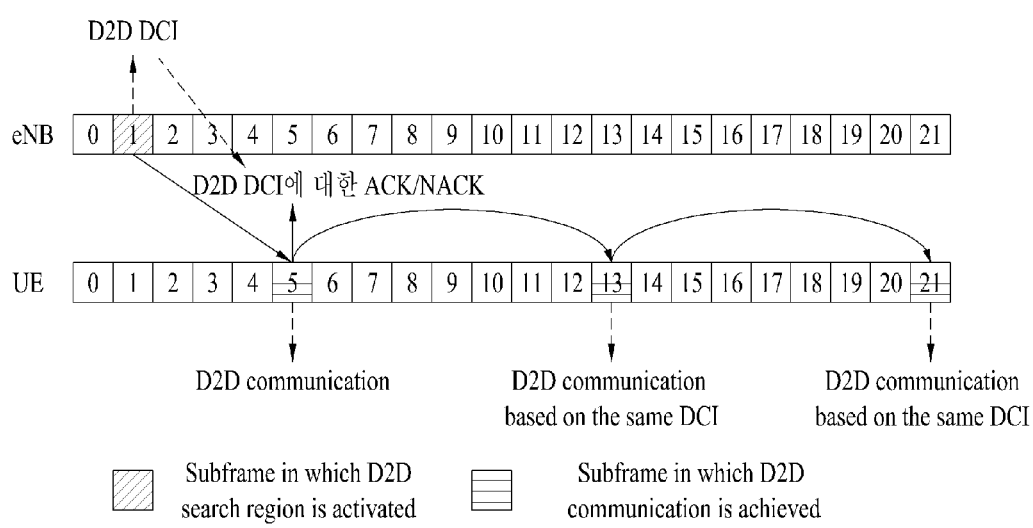
FIG. 17 is a conceptual diagram illustrating a method for transmitting ACK/NACK signals in response to D2D DCI according to the embodiments of the present invention.

FIG. 17 is a conceptual diagram illustrating a method for transmitting ACK/NACK signals in response to D2D DCI according to the embodiments of the present invention.

Generally, in case of LTE FDD, PDCCH/EPDCCH transmitted at the subframe #n may schedule PDSCH at the same subframe, and the associated ACK/NACK information may be transmitted at the subframe #(n+4).

Referring to FIG. 17, assuming that D2D DCI is transmitted at the subframe #n and D2D communication is achieved at the subframe #(n+4), the UE must concurrently perform ACK/NACK transmission and D2D communication at the subframe #(n+4), because a time interval between D2D DCI transmission and D2D communication is identical to a time interval between PDSCH scheduling DCI transmission and ACK/NACK transmission.

The operation for simultaneously performing D2D communication and ACK/NACK transmission of D2D DCI within one subframe may be considered undesirable, because there is a large difference in Tx power between a Tx signal of D2D and a Tx signal of ACK/NACK of D2D DCI so that the system has difficulty in correct operation. In addition, D2D communication can be achieved within a relatively short distance range and the ACK/NACK Tx signal causes high interference to the D2D reception operation, so that the above operation may also be considered undesirable.

In order to solve the above-mentioned problem, a time interval between D2D DCI transmission and D2D communication is longer than a time interval between PDSCH scheduling DCI transmission and ACK/NACK transmission, and the UE may first report the D2D DCI reception result and may then perform D2D communication.

Figure 18:
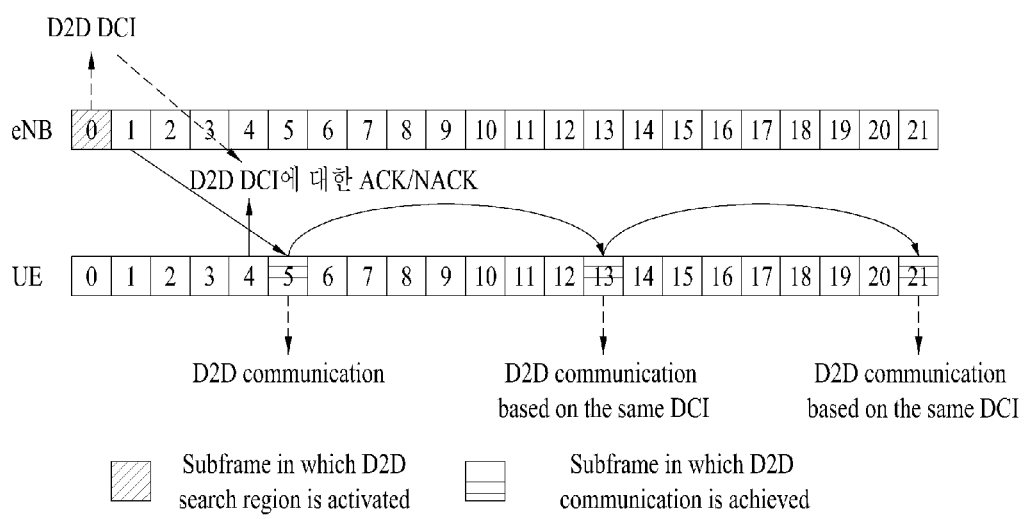
FIG. 18 is a conceptual diagram illustrating another method for transmitting ACK/NACK signals in response to D2D DCI according to the embodiments of the present invention.

FIG. 18 is a conceptual diagram illustrating another method for transmitting ACK/NACK signals in response to D2D DCI according to the embodiments of the present invention.

Referring to FIG. 18, a time interval between D2D DCI transmission and DCI communication is increased by 1 ms as compared to FIG. 17, so that D2D DCI can be transmitted at the subframe #0. That is, the UE receives D2D DCI at the subframe #0, transmits the associated ACK/NACK to the eNB at the subframe #4, and must perform D2D communication with another UE at the subframe #5.

As described above, assuming that D2D DCI transmitted by several subframes controls D2D communication within one subframe, the subframe in which the last D2D DCI capable of scheduling D2D communication at a specific subframe may be present. In FIG. 18, the subframe #0 may correspond to the last D2D DCI transmission subframe.

In the case of using the LTE FDD system having a time interval of 4 ms between PDSCH scheduling and PDSCH ACK/NACK, D2D DCI indicating D2D communication at the subframe #n must be transmitted either at the subframe #(n−5) or prior to the subframe #(n−5) so that reception or non-reception of D2D DCi can be indicated and D2D communication can be carried out.

ACK/NACK transmission of the above-mentioned D2D DCI may be performed not only in D2D DCI indicating initiation of D2D communication, but also in D2D DCI indicating stop of D2D communication. That is, the UE having received a command for indicating stop of current D2D communication may indicate that the corresponding indication message has been correctly received through ACK/NACK transmission in the same manner as in the above example.

Figure 19:
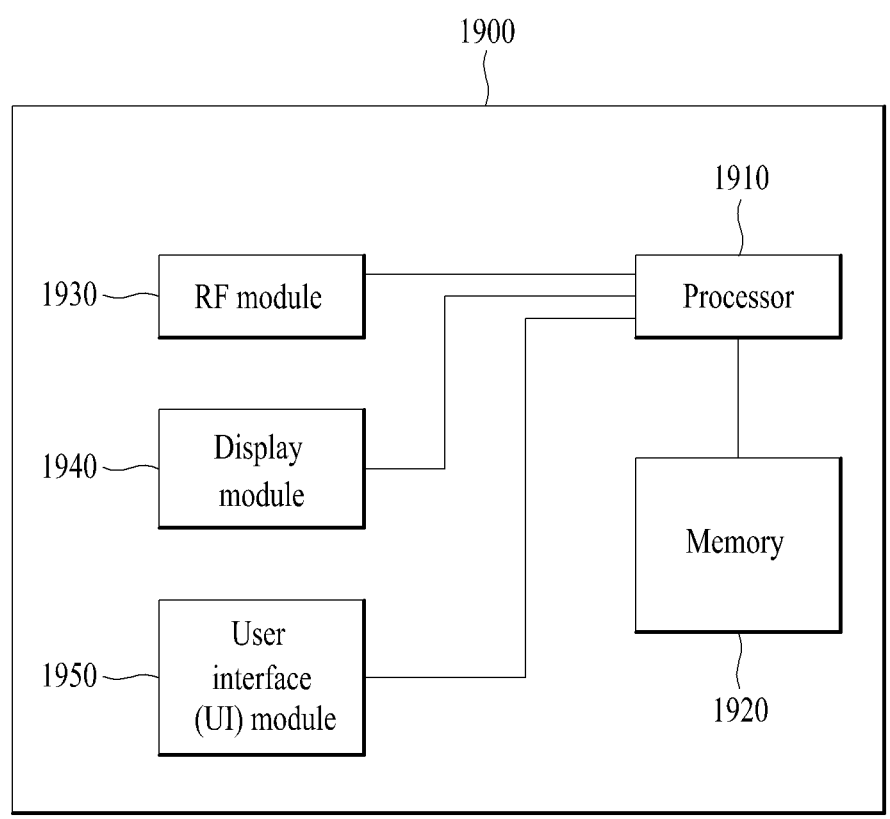
FIG. 19 is a block diagram illustrating a communication device according to embodiments of the present invention.

FIG. 19 is a block diagram illustrating a communication device according to embodiments of the present invention.

In FIG. 19, the communication device 1900 includes a processor 1910, a memory 1920, a Radio Frequency (RF) module 1930, a display module 1940, and a user interface (UI) module 1950.

The communication device 1900 is disclosed for illustrative purposes only and certain modules may also be omitted from the communication device 1900 as necessary. In addition, the communication device 1900 may further include necessary modules. Some modules of the communication device 1900 may be identified as more detailed modules. The processor 1910 is configured to carry out the operations of the embodiments of the present invention. For detailed operations of the processor 1910 reference may be made to FIGS. 1 to 18.

The memory 1920 is connected to the processor 1910, and stores an operating system, applications, program code, data and the like. The RF module 1930 is connected to the processor 1910 and converts a baseband signal into a radio frequency (RF) signal, or converts the RF signal into the baseband signal. For these operations, the RF module 1930 performs analog conversion, amplification, filtering, and frequency up-conversion in order or performs such operations in reverse order. The display module 1940 is connected to the processor 1910 and displays a variety of information. The scope or spirit of the display module 1940 of the present invention is not limited thereto, and the display module 1940 may be any of well-known elements, for example, a Liquid Crystal Display (LCD), a Light Emitting Diode (LED), an Organic Light Emitting Diode (OLED) and the like. The user interface (UI) module 1450 is connected to the processor 1910, and may be implemented as a combination of user interfaces such as a keypad, a touchscreen, etc.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

INDUSTRIAL APPLICABILITY

As is apparent from the above description, although the method and apparatus for transmitting control information for D2D direct communication in a wireless communication system have been disclosed on the basis of application to 3GPP LTE, the inventive concept of the present invention is applicable not only to 3GPP LTE, but also to other mobile communication systems.

The invention claimed is:

1. A method for performing Device-to-Device (D2D) communication by a user equipment (UE) in a wireless communication system, comprising:
  receiving a first scheduling message for the D2D communication from a base station (BS); and
  performing the D2D communication with a target UE based on the first scheduling message for the D2D communication,
  wherein a length of the first scheduling message for the D2D communication is identical to a length of a second scheduling message for a communication between the UE and the BS, and
  wherein the first scheduling message for the D2D communication is detected in a search space of the second scheduling message for the communication between the UE and the BS, by using a specific identifier.

2. The method according to claim 1, wherein the first scheduling message for the D2D communication is received throughout at least two subframes among a plurality of subframes configured for the first scheduling message for the D2D communication.

3. The method according to claim 1, wherein the first scheduling message for the D2D communication includes specific information indicating whether the UE is a transmitter or receiver of the D2D communication.

4. The method according to claim 3, wherein the first scheduling message for the D2D communication includes a specific field for controlling transmit (Tx) power,
- wherein the specific field indicates Tx power for a data of the D2D communication when the UE is indicated as the transmitter of the D2D communication, and
- wherein the specific field indicates Tx power for a response signal of the data of the D2D communication when the UE is indicated as the receiver of the D2D communication.

5. The method according to claim 1, wherein the first scheduling message for the D2D communication is used to schedule the D2D communication in a predetermined number of subframes.

6. The method according to claim 5, wherein the first scheduling message for the D2D communication is used to schedule the D2D communication until information indicating invalidity of the first scheduling message for the D2D communication is received from the BS.

7. The method according to claim 1, further comprising:
- transmitting an ACKnowledgment/Negative ACKnowledgment (ACK/NACK) signal of the first scheduling message for the D2D communication to the BS.

8. The method according to claim 7, wherein the ACK/NACK signal is transmitted with performing the D2D communication.

9. The method according to claim 7, wherein the ACK/NACK signal is transmitted before performing the D2D communication.

10. A user equipment (UE) device for performing Device-to-Device (D2D) communication in a wireless communication system, comprising:
- a radio frequency (RF) communication module configured to transmit/receive a radio frequency (RF) signal to a base station (BS) or a counterpart UE of the D2D communication;
- a processor configured to process the RF signal,
- wherein the processor receives a first scheduling message for the D2D communication from the BS, and performs D2D communication with a target UE based on the first scheduling message for the D2D communication,
- wherein a length of the first scheduling message for the D2D communication is identical to a length of a second scheduling message for a communication between the UE and the BS, and
- wherein the processor detects the first scheduling message for the D2D communication in a search space of the second scheduling message for the communication between the UE and the BS, by using a specific identifier.

* * * * *